United States Patent [19]

Todorovic

[11] 4,021,160
[45] May 3, 1977

[54] ORBITAL MOTOR

[76] Inventor: Vukasin Todorovic, 220 Littleton Road, Apt. F4, Parsippany, N.J. 07054

[22] Filed: Dec. 15, 1975

[21] Appl. No.: 640,635

Related U.S. Application Data

[63] Continuation-in-part of Ser. No. 585,307, June 9, 1975, abandoned.

[52] U.S. Cl. .............................. 418/61 R; 418/64; 123/8.45
[51] Int. Cl.² ...................... F01C 1/02; F02B 53/00
[58] Field of Search ................. 123/8.45; 418/61 R, 418/61 A, 63, 64

[56] References Cited

UNITED STATES PATENTS

| | | | |
|---|---|---|---|
| 3,787,150 | 1/1974 | Sarich | 418/61 R |
| 3,919,980 | 11/1975 | Veatch | 418/61 R X |
| 3,923,431 | 12/1975 | Abbey | 418/61 R |
| 3,953,159 | 4/1976 | Hunter | 123/8.45 |

FOREIGN PATENTS OR APPLICATIONS

| | | | |
|---|---|---|---|
| 164,947 | 6/1949 | Austria | 123/8.45 |
| 1,006,530 | 4/1952 | France | 123/8.47 |

*Primary Examiner*—Carlton R. Croyle
*Assistant Examiner*—Leonard Smith

*Attorney, Agent, or Firm*—J. Llewellyn Mathews; H. Hume Mathews

[57] ABSTRACT

An engine, pump or motor is disclosed of a type generally similar to the "Wankel" engine, except that the present invention is characterized by purely orbital motion of the piston to produce rotation of the output shaft. Preferably the shaft has two eccentric sections in radial alignment, the first eccentric axis being displaced from the main axis, one half the displacement of the second eccentric axis from the main axis. A pinion is rotatably mounted about the first eccentric axis. A fixed internal ring gear is fixed against rotation and mounted about the main axis so as to engage the pinion at a point in radial alignment with the two eccentric axes. An orbital ring gear is preferably identical to the fixed ring gear and rotatably mounted about the second eccentric axis so as to engage the pinion at a point on the pinion diametrically opposite the point of engagement of the pinion and the fixed ring gear. The piston is also rotatably mounted about the second eccentric axis and fixed to the orbital ring gear. The gearing means described will translate purely orbital motion of the piston into rotational motion of the shaft. Radially extending vanes attached to the piston are also disclosed as defining several fluid or combustion chambers, as is known in the art. Alternative embodiments of the gearing means are disclosed.

8 Claims, 9 Drawing Figures

ORBITAL MOTOR

This application is a continuation-in-part of my copending application, Ser. No. 585,307, filed June 9, 1975, and now abandoned.

BACKGROUND OF THE INVENTION

The combined rotary and orbital motion of the "Wankel" engine is now well known and there have also been numerous attempts to improve on the basic concept embodied in that engine. Many of these attempts have been directed at the chief problem in the Wankel, i.e., excessive wear and poor sealing at the point of contact between the rotor or piston and the wall of the combustion chamber. Possibly the ideal solution to this problem is to prevent rotational motion of the piston and allow only orbital motion. This has been attempted in a number of different constructions as shown typically in U.S. Pat. No. 3,703,344 to Reitter; 3,787,150 to Sarich; and 3,812,828 to Griffith. Most of the structures which limit the piston to orbital motion have a piston journalled on an eccentric shaft and a number of vanes between the piston and the cylinder housing. These vanes define distinct combustion chambers between themselves and reciprocate in the housing as the piston orbits. In some constructions the vanes themselves prevent rotation of the piston; however, sizeable bending and shear forces result on the vanes in these designs requiring heavy construction and producing high friction.

In a different version of a purely orbital motor, patented by Sarich and cited above, the tendency of the piston to rotate is prevented by means of two or more shafts, each having an eccentric portion on which the piston is mounted. This is mechanically equivalent to a parallelagram linkage between the piston and the cylinder to constrain the motion of the piston and take the pressure off the vanes. In the present invention, purely orbital motion of the piston is achieved through gearing associated with the cylinder, the piston, and the shaft to achieve a more efficient and rugged engine than in the prior art.

SUMMARY OF THE INVENTION

This invention may be a motor, compressor or pump, but is specifically designed as an internal combustion engine, having at least one cylinder and at least one piston.

The piston is mounted eccentrically on a shaft and constrained through gear means so that it will orbit, but not rotate, within the cylinder as the shaft rotates. Vanes are associated with the cylinder and piston so as to define a plurality of combustion chambers around the piston and to reciprocate radially with respect to the cylinder as the piston orbits. As used in this application, the word "cylinder" shall refer to the space in which the piston orbits, but it should be understood that the "cylinder" need not have a perfectly cylindrical geometric shape.

Orbital motion of the piston is allowed, and rotation prevented, by gear means associated with the cylinder, the piston and the shaft. In the preferred embodiment, the shaft has two eccentric sections in radial alignment, the first eccentric axis being displaced from the shaft center one-half the distance of the second eccentric axis. An external gear (pinion) is journalled on the first eccentric section of the shaft and the piston is journalled on the second eccentric section. The pinion engages two identical ring gears, the first of which is fixed from rotation with respect to the cylinder and centered about the second eccentric axis. In this preferred structure the pinion always engages the first ring gear at a point on the pinion diametrically opposite the point of engagement of the pinion with the second ring gear.

In mathematical terms, the preferred embodiment may be described by stating that, one positive revolution of the shaft must be accompanied by one relative negative revolution of the second ring gear, which is rotatively fixed to the piston. The numbers of teeth on each gear will determine this relationship according to the equation $(+) 1$ shaft revolution $= F/P \times P/O = (-) 1$ revolution of the second ring gear, *relative to the shaft* $+ 1$ orbit of the second ring gear, where F, P and O are the numbers of teeth in the first (or fixed) ring gear, the pinion and the second (or orbital) ring gear, respectively. It may be seen that the arrangement of the gearing described will prevent the second ring gear and consequently the piston, from rotating while allowing them to orbit about the main axis of the shaft. The resultant orbital motion of the piston will impart rotary motion directly to the main shaft. In alternative embodiments, different gear means may be utilized having different diameters, numbers of teeth, etc. provided that the same ultimate result is obtained.

In the preferred embodiment, the piston is provided with five vanes defining five distinct combustion chambers, the vanes being radially slideable in vane receiving slots in the cylinder wall, and tangentially slideable in slots in the piston. Of particular advantage in this invention is that all points or lines which require sealing are between surfaces which are parallel, and all sliding movement occurs in directions perpendicular to a sealing surface. Further, unlike the Wankel, there are no rings or seals directly exposed to the combustion process and all of the seals may be positively lubricated for greater efficiency and longer life.

OBJECTS OF THE INVENTION

Accordingly, it is an object of this invention to provide an internal combustion engine, a pump, or motor with at least one piston exhibiting purely orbital motion within a cylinder.

A further object is to provide simple and efficient gearing means for translating orbital motion of the piston to rotational motion of the shaft.

Still a further object is to provide an engine, pump or the like, having a plurality of vanes defining distinct combustion chambers within the cylinder and being slideable in radial slots in the cylinder.

Yet another object of the invention is to provide an engine or the like, wherein all of the combustion chamber seals are positively lubricated and protected from the combustion environment.

Other objects and advantages of the invention will be apparent from the following detailed description.

DETAILED DESCRIPTION OF A PEFERRED EMBODIMENT

Figure 1:
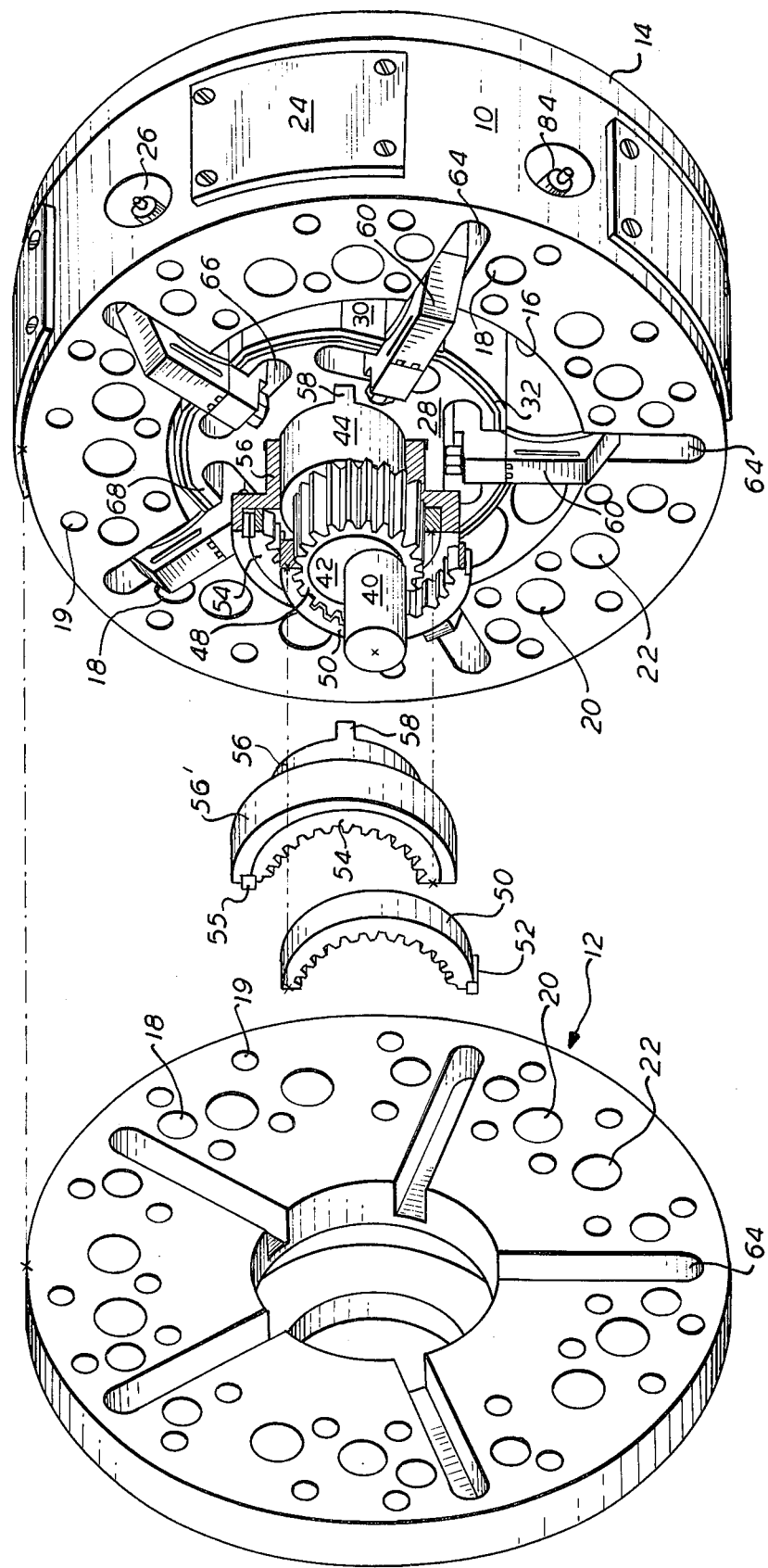
FIG. 1 is a perspective partially exploded view of a preferred embodiment of this invention.
Figure 2:
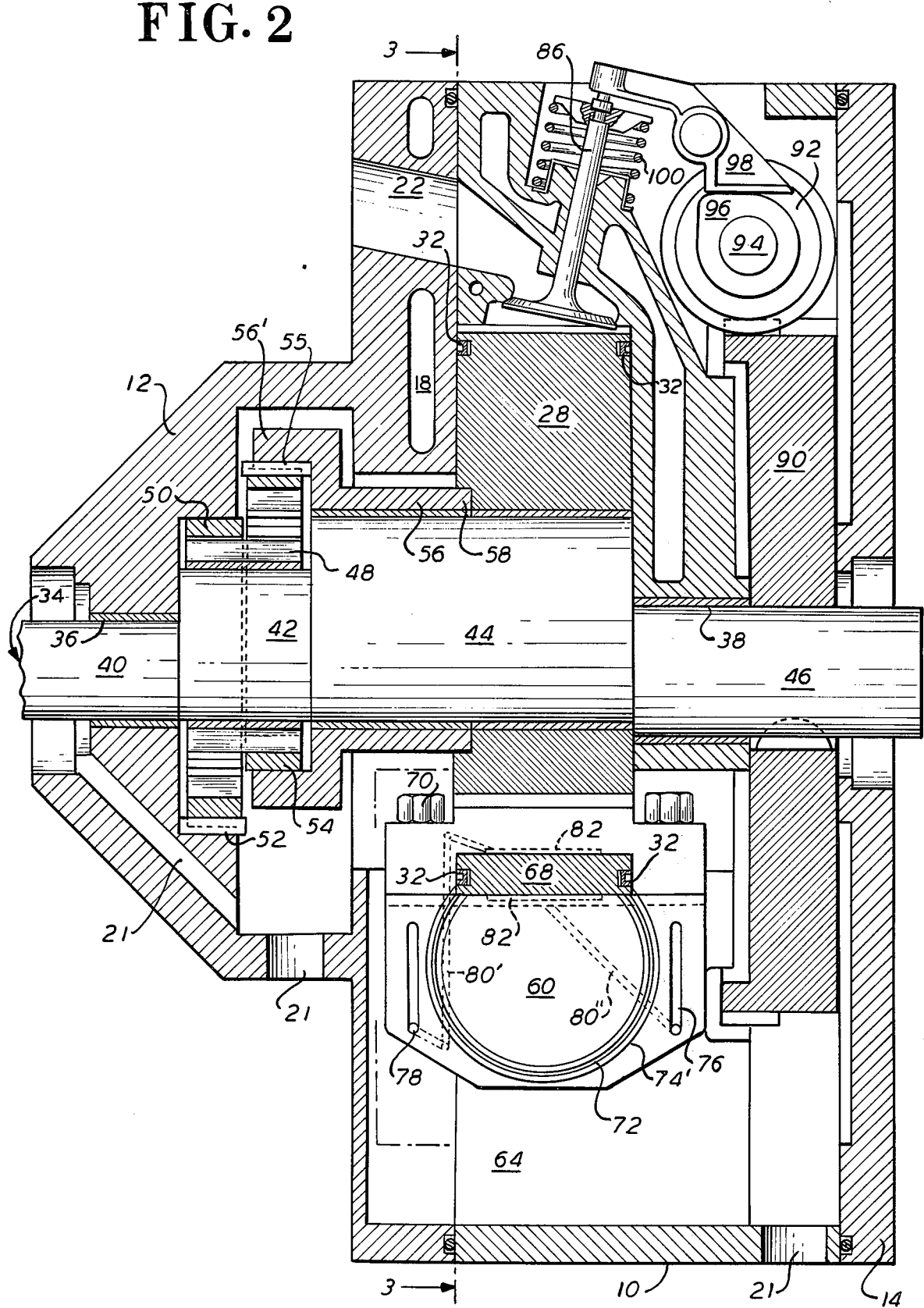
FIG. 2 is a sectional view of the invention taken along the main axis of the shaft.

The preferred embodiment of this invention is an internal combustion engine; however, it should be understood that the invention may be easily adapted as a pump or motor or for other uses generally known to the art.

In its broadest concept, this invention comprises gear means for limiting an eccentrically mounted piston to purely orbital motion and translating said orbital motion into rotational motion of the shaft (or vice versa). Said gear means requires only a single shaft as opposed to some known prior art. Although a highly preferred embodiment is described herein, it is contemplated that a multitude of mechanical equivalents will be apparent to those skilled in the art.

In the form of an internal combustion engine, shown in the drawings, a cylinder housing 10 has a front plate 12 enclosing the working mechanism of the invention. The cylinder housing 10 is generally cylindrical in shape with a central cavity forming a single cylinder 16 having rear face 17 therein. Cylinder housing 10 is also provided with coolant paths 18, bolt holes 19, intake ports 20, exhaust ports 22, valve covers 24, spark plug sockets 26, and other conventional features as are typically associated with internal combustion engines.

A single orbiter or piston 28 is located within the cylinder 16. The piston 28 is generally cylindrical in shape, except that it is provided with a number of flat portions 30 (hereinafter "flats") around its circumference. As shown in the drawings, five flats 30 are preferred; however, this number may be varied with the number of vanes as will be seen more fully below. The piston 28 is also provided with a sealing ring 32 on each side near the outer periphery of the piston and preferably conforming to the peripheral contour thereof. When the front end plate 12 is assembled, piston rings 32 engage the face of the end plate 12 and the rear face 17 of the cylinder 16 to seal the cylinder 16 against leakage.

Figure 4:
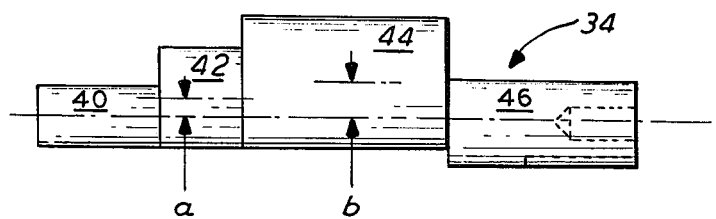
FIG. 4 is a detail view of the shaft.

A primary shaft generally designated 34, is journalled as shown at 36 in the front end plate 12, and as shown at 38, in the rear of cylinder housing 10. The shaft 34 preferably has a front section 40, a first eccentric section 42, a second eccentric section 44 and a rear section 46, as best shown in FIG. 4. The front and rear sections are centered about a common axis (primary axis) and journalled, as described, in the front end plate 12 and cylinder housing 10. The rear section 46 of the shaft may be of a larger diameter than the front section 40 so that it may bear a heavier load or torque; however, the axes of the front and rear sections are coincident with each other. Further, as the shaft 34 is supported in the engine the axis of the front and rear sections of the shaft coincide with the cylindrical axis of the cylinder housing 10 and cylinder 16. The two eccentric sections 42 and 44 are radially aligned and in the preferred embodiment the displacement $a$ of the first eccentric axis is one-half the displacement $b$ of the second eccentric axis, with respect to the main shaft axis, as illustrated in FIG. 4. While the drawings show a shaft with two eccentric sections, a multiple crankshaft is also envisioned to be within the meaning of the word "eccentric" as used above.

The length of each portion of the shaft 34 is determined by the arrangement of the piston and gearing as follows. An external gear or pinion 48 is rotatably mounted on the first eccentric section 42 of the shaft 34. A first internal or ring gear 50 is centered about the main axis mounted on the front end plate 12, and the same is fixed with respect to the front end plate 12 by a key 52. This first ring gear 50 will be referred to as the "fixed ring gear". A second, orbiting ring gear 54 is preferably identical to the first in diameter and number of teeth, but the orbiting ring gear 54 is centered about the second eccentric axis. The orbiting ring gear 54 is not mounted directly on the second eccentric section 44 of the shaft 34, but it is keyed at 55, and supported by a sleeve 56 which is rotatably mounted on the second eccentric section 44 of shaft 34. Splines 58 or other fastening means connect the sleeve 56 to the piston 28 which is also rotatably mounted on the second eccentric section 44 of the shaft 34. It may be seen, therefore, that the orbiting ring gear 54, the sleeve 56 and the piston 28 are connected to each other and rotatably mounted as one unit on the second eccentric section 44 of the shaft 34. The sleeve 56 includes a collar 56' or other means for receiving the orbiting ring gear 54 so that it engages the pinion 48.

In mathematical terms, one positive revolution of the shaft must induce one *relative* negative revolution to the orbital ring gear. The numbers of teeth on each gear will determine this relationship according to the equation (+) 1 shaft revolution = $F/P \times P/O$ = (−) 1 revolution of the orbital gear, *relative to the shaft* = (+) 1 orbit of the orbital gear, where F, P and O are the number of teeth in the fixed pinion and orbital gears, respectively. It may be seen from this description of the preferred embodiment that the fixed ring gear 50 will engage the pinion 48 at the point in radial alignment with the two eccentric axes, and that the orbiting ring gear 54 will engage the pinion 48 at the point on the pinion diametrically opposite the point of engagement of the fixed ring gear 50 with the pinion 48. Further, the diametric opposition of these two points of engagement will be the same regardless of the position of the piston and shaft through the combustion cycle. IN effect the two ring gears 50 and 54 form a cage within which the captive pinion 48 may roll. Since the fixed ring gear 50 is prevented from rotating by key 52, the only possible motion which the orbiting ring gear 54 may exhibit is orbital motion, absolutely devoid of rotation. Since the orbiting ring gear 54 may orbit, the sleeve 56 and piston 28 may also orbit, but not rotate, as the shaft 34 is turned.

Figure 8:
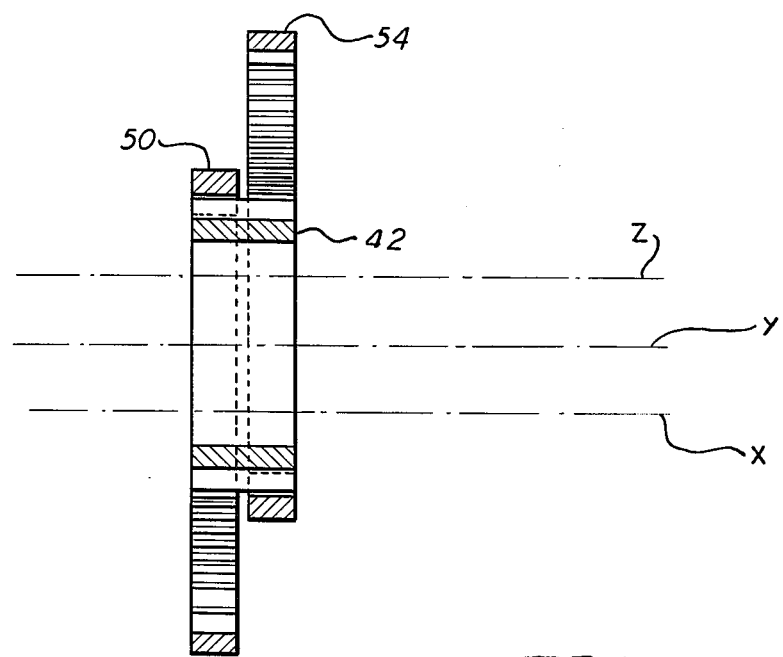
FIG. 8 is a view of the preferred gear means removed from the engine to show the details of the arrangement of the gears, primarily for comparison with FIG. 9.
Figure 9:
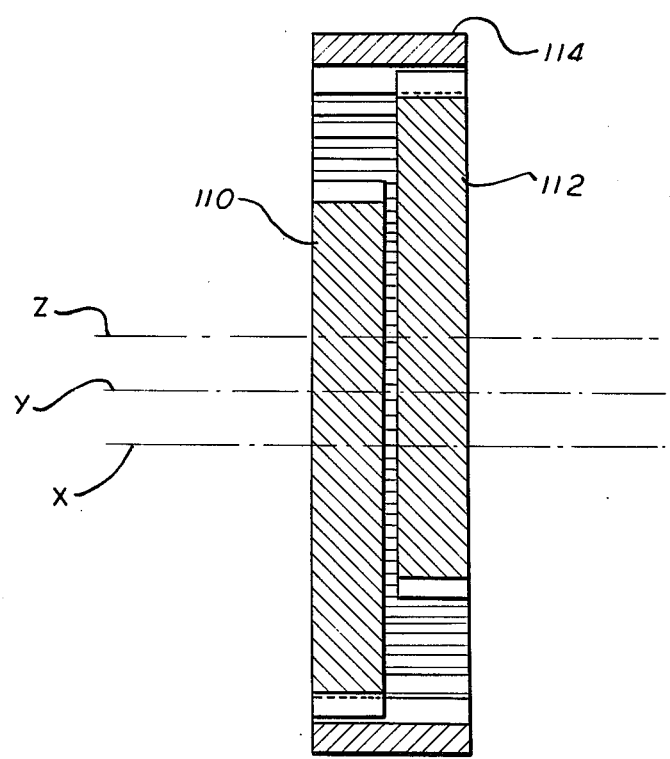
FIG. 9 is a view of an alternate gearing arrangement similar to the view of FIG. 8.

The gear means described above are strongly preferred for the reasons that it is believed to be the simplest, most efficient and easiest to manufacture of known embodiments. Nevertheless, other mechanical equivalents are known to produce the same results. FIG. 8 shows schematically the relation and engagement of the fixed ring gear 50 about axis $x$, the orbital ring gear 54 about axis $z$ and the captive pinion about axis y. FIG. 9 may be compared to FIG. 8, and illustrates an embodiment wherein external gears 110 and 112 are substituted for the preferred ring gears 50 and 54, and a wife ring gear 114 is substituted for the preferred pinion 42. First pinion 110 is fixed to the housing about axis x, second pinion 112 is fixed to the piston about axis z and the ring gear 114 may float in captive fashion about axis y (alternatively note that pinion 112 may float in captive fashion and the ring gear 114 may be attached to the piston but this would result in less displacement of the piston for the same gearing). Additionally, it is possible that in place of a single wide pinion 42 or a wide ring gear 114 a double stepped pinion or ring may be provided having different diameters or numbers of teeth to engage differing gears attached to the cylinder housing 10 and the piston 28. In such a case, it may also be necessary that the displacement of the first eccentric section 42 be more or less than half the displacement of the second eccentric section 44 to maintain the requirement that rotation of the shaft 34 must result in purely orbital motion of the piston 28. Other variations and embodiments of equivalent gear means should be apparent to those skilled in the pertinent art.

Figure 3:
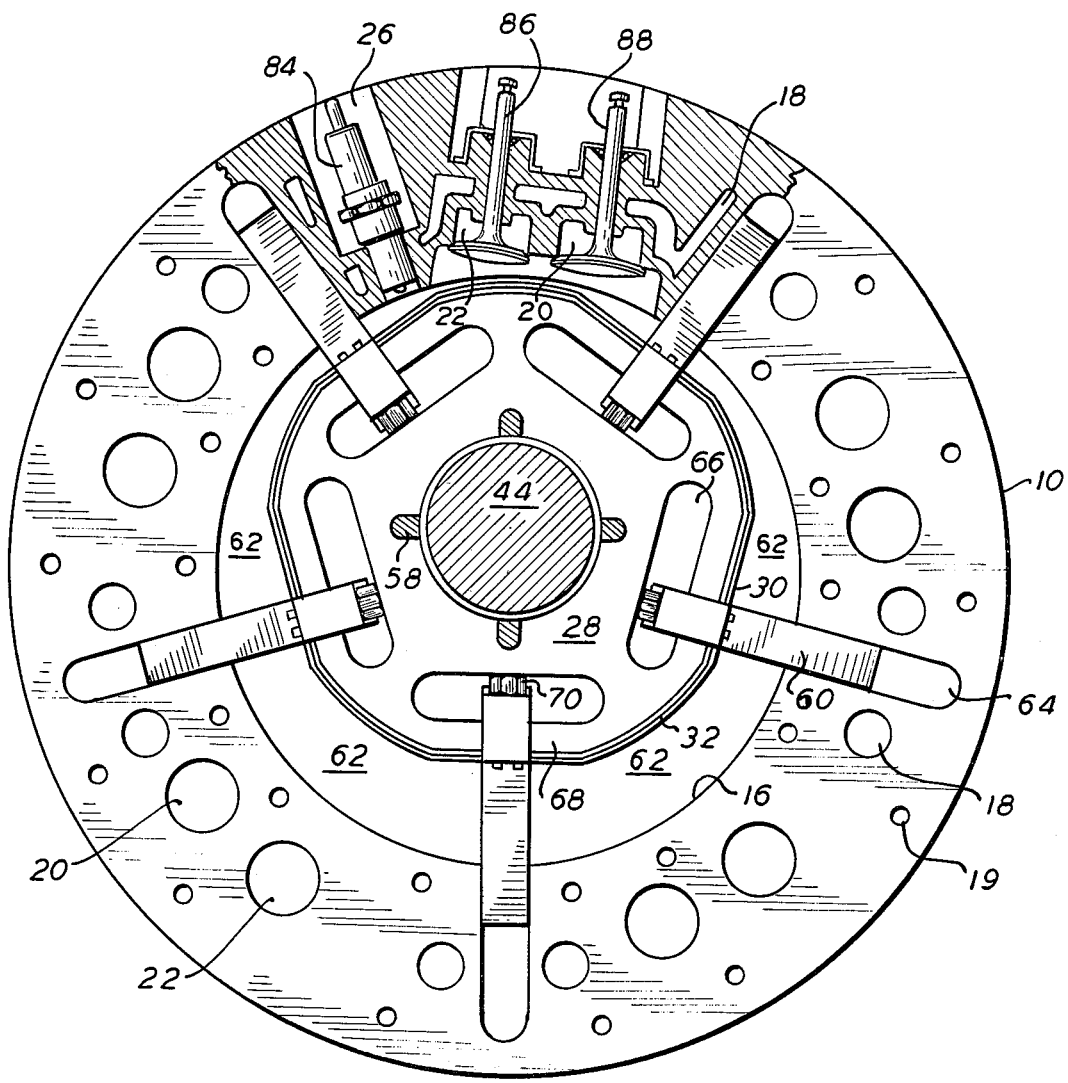
FIG. 3 is a section taken along the line 3—3 shown in FIG. 2.

Preferably this engine is provided with five vanes 60 defining five distinct combustion chambers 62, as seen in FIG. 3. The vanes 60 are slidingly received in slots 64 formed partly in the cylinder housing 10 and partly in the front end plate 12. Each slot 64 is aligned radially with respect to the main axis of the shaft 34 and it should be evident that as the piston orbits within the cylinder 16, the vanes 60 will slide in and out of slots 64. The piston is also provided with five piston slots 66 which define bridges 68 between each piston slot 66 and each flat 30 on the periphery of the piston 28. The piston slots 66 are aligned tangentially with respect to the main axis of shaft 34 and extend fully through the piston. The vanes 60 are slideably mounted on the bridges 68 so that the vanes 60 may slide tangentially with respect to the piston 28 as it orbits. It may now be seen that all sliding movement in this engine will occur on flat surfaces and that the direction of movement will be perpendicular to said surfaces.

Figure 5:
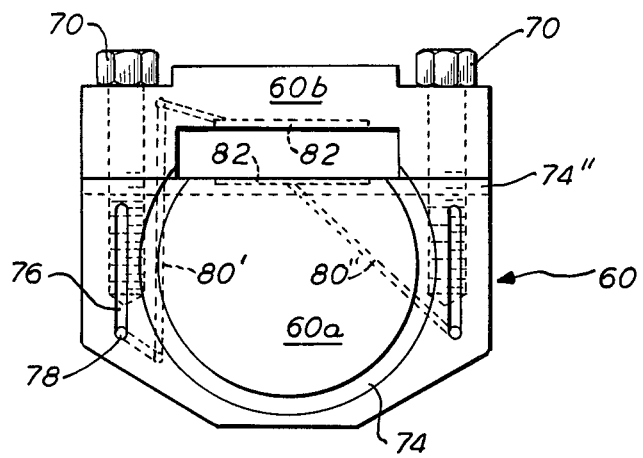
FIG. 5 is a detail view of a single vane showing the means for lubricating and sealing the surfaces thereof.
Figure 6:
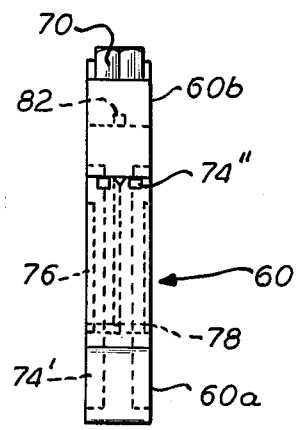
FIG. 6 is an end view of the vane shown in FIG. 5.
Figure 7:
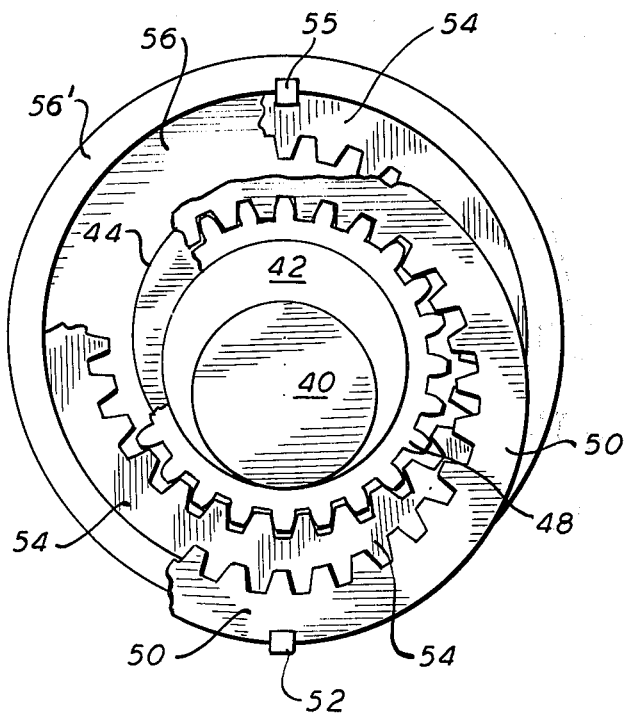
FIG. 7 is an end view of the shaft, gears and sleeve as they would appear when removed from the engine or the like. Portions of the FIGURE are cut away to show the detail of engagement of the gears.

A vane 60 is shown in detail in FIGS. 5 and 6. It is shown as having two portions 60a and 60b which are connected by bolts 70. One portion of the vane 60 is provided with a recess in which a bridge 68 is received when the vane is mounted on the piston 28. Sealing of the combustion chamber 62 is accomplished by means of rings 72, similar to the rings 32 placed in the faces of piston 28, are placed in ring grooves 74 in the vane 60. A first ring 72 is preferably inserted in an arcuate groove 74' located on each broad face of a vane 60 so as to provide a sliding seal between the vane 60 and the interior surfaces of slot 64 in the housing 10. Two additional rings 72 are inserted in straight grooves 74" so as to bear against and to provide a sliding seal between a flat 30 on the piston 28 and the corresponding face of a vane 60. It may be seen from this description that the three sets of rings, one set in each of grooves 74' and 74" in each vane 60 and one set 32 on the piston 28 will completely seal the cylinder 16 as well as each individual combustion chamber 62 from leakage. Further, all of the rings may be positively lubricated, unlike the "Wankel" rotary engine, and none are continuously exposed to the combustion process.

The lubrication channels in a typical vane are best seen in FIGS. 5 and 6. Two oil grooves 76 are provided on each face of a vane 60 located outside of the arcuate groove 74'. Two holes 78 are drilled through the vane to allow flow of oil from an oil groove 76, through to the oil groove 76 in the opposite face. Internal channels 80' and 80" are also formed in the interior of vane 60 to allow oil flow from one hole 78 to an oil groove 82 in the surface of a vane 60 which bears against the flat 30 of piston 28; and from the other hole to an oil groove 82 in the surface of vane 60 which bears against the interior surface (opposite flat 30) of bridge 68. Oil is supplied to the grooves 76 from feed holes, not shown, in the slots 64 and drain holes 21 are provided in the cylinder housing 10 and end plate 12. As a vane reciprocates a feed hole should be in continuous communication with the corresponding groove 76. It may be seen from this description that all faces of the vanes may be lubricated either by natural oil flow or under pressure. Lubrication to the gears, shaft and other parts of this engine is provided in a conventional manner.

This engine is also provided with conventional parts such as spark plugs 84 and valves 86 and 88. The valves may be controlled in a conventional manner as by a helical gear 90 keyed to the shaft 34 which drives a second helical gear 92. Gear 92 may be connected to a camshaft 94 with cams 96 which bear against rocker arms 98 to operate the valves 86 and 88 against the bias of valve springs 100. It should be understood that a separate set of valves and the associated operating parts will be required for each combustion chamber except that a single helical gear 90 may control several sets of valves. Rear cover plate 14 may be attached to the cylinder housing 10 to cover these gears and valves.

Other conventional accessories such as an oil pump, distributor, etc. are not shown in the drawings, but will obviously be necessary in an internal combustion engine and may easily be connected to any of the camshaft ends. It should also be apparent that, with slight modification, more than one piston may be provided in an engine and that each piston may have its own separate orbital gearing or at least some parts of the orbital system may be shared by more than one piston. Other variations and embodiments of this invention may be apparent to those skilled in the art and it should be understood that the above descriptin is for illustration and is not intended to limit the scope of the claims appended hereto.

I claim:
1. In a motor, engine or pump having a piston mounted rotatable about a primary axis within a cylinder housing, means to limit the piston to orbital motion about the shaft with rotation of the shaft, comprising:
   a. a first gear rotatively fixed with respect to the cylinder housing and mounted about the primary axis;
   b. a second gear rotatively fixed to the piston and mounted about a first axis displaced eccentrically from the primary axis;
   c. third gear means engaging the first and second gears rotatively mounted about a second axis, displaced eccentrically from the primary axis in angular alignment with the first axis relative to the primary axis;
   d. the displacement of the first and second axes and the number of teeth of each gear being selected to satisfy the requirement that orbital motion of the piston is translated to rotational motion of the shaft, both relative to the cylinder housing.
2. An engine, pump or motor comprising:

a. a housing having a cavity therein forming a cylinder about a primary axis, said cylinder having two end walls and a cylinder wall;
b. a piston of generally cylindrical shape, receivable in said cylinder, and mounted for orbital motion on;
c. a shaft extending through the cylinder and rotatable about the primary axis;
d. a first gear fixed to the housing about the primary axis;
e. a second gear rotatively connected to the piston and mounted about a first eccentric axis;
f. third gear means engaging the first and second gears and rotatably mounted about a second eccentric axis;
g. the numbers of teeth on each of the first gear, the second gear, the third gear means and the eccentricity of the first and second eccentric axes satisfies the requirement that rotation of the shaft translates to orbital motion of the piston.

3. In a device of the type having a housing with an opening therein forming a cylinder about a central axis for receiving a piston and for receiving a shaft rotatable about said central axis, the shaft extending through the piston, mean for limiting the piston to orbital motion as the shaft rotates, comprising:
a. first and second eccentric sections on said shaft having first and second eccentric axes in radial alignment, with the first eccentric axis displaced from the central axis one half the distance which the second eccentric axis is displaced from the central axis;
b. an external pinion gear rotatably mounted about the first eccentric axis;
c. a fixed internal ring gear fixedly mounted with respect to the housing about the central axis so as to engage the pinion at a point in radial alignment with the first and second eccentric axes;
d. an orbital internal ring gear of the same diameter and pitch as the fixed ring gear, rotatably mounted about the second eccentric axis so that the orbital ring gear engages the pinion at a point on the pinion diametrically opposite the point of engagement of the fixed ring gear with the pinion;
e. means for mounting the piston on the second eccentric section so that the shaft is rotatable with respect to the piston;
f. means to connect the orbital ring gear to the piston to prevent rotation of the piston with respect to the orbital ring gear.

4. The apparatus of claim 3, wherein the means connecting the orbital ring gear to the piston comprises a sleeve rotatably mounted about the second eccentric axis and attached to the orbital ring gear and to the piston.

5. A device comprising:
a. a housing having a central axis, a cavity in the housing around said axis and a plurality of slots in the housing extending radially with respect to said axis;
b. a front end plate associated with the housing to form a cylinder from said cavity; p1 c. a shaft having a main axis and two eccentric sections defined by first and second eccentric axes, said shaft being supported within the cylinder and being rotatable around its main axis, said first eccentric axis being in radial alignment with the second eccentric axis and said first eccentric axis being offset from the main axis one half the distance of the second eccentric axis;
d. an external pinion gear rotatably mounted about the first eccentric axis;
e. a fixed ring gear fixedly mounted with respect to the housing and centered with respect to said main axis, so as to engage said pinion at a point in radial alignment with the first and second eccentric axes;
f. an orbital ring gear of the same diameter and pitch as the fixed ring gear, but rotatably mounted about the second eccentric axis so as to engage the pinion at a point on the pinion diametrically opposite the point of engagement of the fixed ring gear with the pinion;
g. a piston received in said cavity mounted about the second eccentric axis so that the shaft is rotatable with respect to the piston;
h. means to connect said piston to the orbital ring gear to prevent rotation of the piston relative to the orbital ring gear;
i. a plurality of vanes mounted on the piston extending radially from the piston, being slidably received in the slots in the housing and further being slideable with respect to said piston in a tangential direction so that the vanes will reciprocate in said slots with orbital motion of the piston, said vanes defining a multiple of distinct chambers within the cylinder;
j. means to control the introduction and removal of a working fluid from each chamber whereby purely orbital motion will be exhibited by the piston with rotation of the shaft.

6. The device of claim 5, further comprising sealing means associated with each vane and with the piston to seal each chamber against leakage.

7. The device of claim 5, wherein the peripheral contour of the piston includes a multiple of flat portions extending radially the width of the piston so that each flat portion will slidingly engage a vane.

8. The device of claim 5, wherein the means connecting the piston to the orbital ring gear comprises a sleeve rotatably mounted about the second eccentric axis and attached to the orbital ring gear and to the piston.

* * * * *